US009720307B2

(12) United States Patent
Fee

(10) Patent No.: US 9,720,307 B2
(45) Date of Patent: Aug. 1, 2017

(54) LENS GEAR

(71) Applicant: PROMARK INTERNATIONAL, INC., Bartlett, IL (US)

(72) Inventor: Patrick J. Fee, Chicago, IL (US)

(73) Assignee: PROMARK INTERNATIONAL, INC., Bartlett, IL (US)

(*) Notice: Subject to any disclaimer, the term of this patent is extended or adjusted under 35 U.S.C. 154(b) by 9 days.

(21) Appl. No.: 15/094,758

(22) Filed: Apr. 8, 2016

(65) Prior Publication Data
US 2016/0299413 A1 Oct. 13, 2016

Related U.S. Application Data
(60) Provisional application No. 62/145,883, filed on Apr. 10, 2015.

(51) Int. Cl.
G03B 17/56 (2006.01)
G02B 7/02 (2006.01)
G02B 7/04 (2006.01)
G03B 3/12 (2006.01)

(52) U.S. Cl.
CPC ........... *G03B 17/568* (2013.01); *G02B 7/023* (2013.01); *G02B 7/04* (2013.01); *G03B 3/12* (2013.01)

(58) Field of Classification Search
USPC .................................. 396/529, 544; 359/825
See application file for complete search history.

(56) References Cited

U.S. PATENT DOCUMENTS

2014/0099096 A1* 4/2014 Fabrega ................. G02B 15/14
396/544
2015/0286028 A1 10/2015 McCurry

OTHER PUBLICATIONS

Backscatter, "Aquatica Zoom Gear: Nikon 24-70mm f/2.8 G & 14-24mm f/2.8G ED & Tokina 12-24mm & 11-16mm," Backscatter Underwater Video & Photo, Retrieved from the internet Apr. 9, 2015 <http://www.backscatter.com/sku/aq-18722.Iasso> (2 pages).
Backscatter, "Aquatica Zoom Gear: Canon 16-35 mm f/2.8 L II USM & 17-40 f/4 L USM," Retrieved from the internet Apr. 9, 2015, <http://www.backscattercom/sku/aq-18708.lasso> (2 pages).
Backscatter, "Aquatica Zoom Gear: Tokina 10-17mm lens," Retrieved from the internet Apr. 9, 2015, <ttp://www.backscatter.com/sku/aq-18717.lasso?s1op=cn&s1=Aquatica%20Zoom%20Gear%3A%20Tokina%2010-&sop=AND&sf=Price&so=Descending&ftn=&> (2 pages).
Andorama, "Chrosziel C-206-24 Gear Ring for Panasonic HVX-200, Sony EX1/EX3/Z5, Fujinon XS8x4—95mm," >http://www.adorama.com/chrc20624.html> Available as early as Apr. 2, 2015 (4 pages).
Chrosziel, "Product catalogue DSLR accessories," dated May 2012, (8 pages).
(Continued)

*Primary Examiner* — Rochelle-Ann J Blackman
(74) *Attorney, Agent, or Firm* — Michael Best & Friedrich LLP

(57) ABSTRACT

A gear for adjusting a camera lens barrel includes a gear body having a continuous inner surface defining an inner diameter and a continuous outer surface defining an outer diameter. The gear is elastically deformable such that the gear is securable about the camera lens barrel whereby the gear is removable and is reusable. The inner diameter of the gear is elastically deformable by at least 0.6 millimeters.

16 Claims, 4 Drawing Sheets

(56) References Cited

OTHER PUBLICATIONS

Vocas "Flexible gear ring, with 2 movable stops," <http://www.vocas.com/accessories/fexiblegearringwith2movablestops> Available as early as Apr. 3, 2015 (3 pages).
B&H "Ikan 2.5-4.25" Diameter Adjustable Lens Zip Gears (3 Pack)," <http://www.bhphotovideo.com/c/product/792467-REG/Ikan_ELE_FGK_LG3_2_5_4_25_Diameter_Adjustable_Lens.html> Available as early as Apr. 3, 2015 (3 pages).
B&H "Zacuto Z-ZG-16 ZipGear," <http://www.bhphotovideo.com/c/product/588985-REG/Zacuto_Z_ZG_16_Z_ZG_16_ZipGear.html> Available as early as Apr. 3, 2015 (3 pages).
B&H "Wide Open Camera Universal Lens Gear," <http://www.bhphotovideo.com/c/product/839296-REG/Lens_Gear_605859_LENSGEAR_UNIVERSAL_LENS.html> Available as early as Apr. 3, 2015 (3 pages).
B&H "Redrock Micro microLensGear Size C (Black)," <http://www.bhphotovideo.com/c/product/673314-REG/Redrock_Micro_3_200_0006_microLensGear_Size_C_Black.html> Available as early as Apr. 3, 2015 (3 pages).
Dan McComb, "One ring to rule them all: seamless focus gears by mechanical engineer Sean McCurry," danmccomb.com, <http://www.danmccomb.com/tips/nailed-it-seamless-focus-gears-by-mechanical-engineer-sean-mccurry/> Published online Mar. 21, 2014.

\* cited by examiner

LENS GEAR

CROSS-REFERENCE TO RELATED APPLICATIONS

This application claims priority to U.S. Provisional Patent Application No. 62/145,883, filed on Apr. 10, 2015, the entire contents of which are incorporated herein by reference.

FIELD OF THE INVENTION

The present disclosure relates to a gear attachable to a video or camera lens barrel.

BACKGROUND

As shown in FIG. 1, integrated lens gears 4 often come as a feature on high end cinema lenses. These integrated lens gears 4 are generally located on the focus, zoom, and aperture barrels of the lens and are used with an external actuator having gears that can be enmeshed with the integrated gears to rotate the corresponding lens barrel. For example, the integrated gears 4 can be used in conjunction with an exterior geared motor to precisely drive the desired lens barrel into position. The gear 4 may also be used in conjunction with a follow focus which is a manual, dial-adjusted geared apparatus for adjusting the focus of the lens. The integrated lens gear cannot be removed from or repositioned on a lens barrel.

When a lens does not have an integrated lens gear, a supplemental gear can be installed onto the lens for remote adjustment. These supplemental gears often include unsightly or awkward buckles that can get in the way when attempting to rotate the lens barrel 360 degrees. In some prior art designs, tools are necessary for the assembly, repositioning, or removal of the supplemental gear.

SUMMARY

In one embodiment, a gear for adjusting a camera lens barrel includes a gear body having a continuous inner surface defining an inner diameter and a continuous outer surface defining an outer diameter. The gear is elastically deformable such that the gear is securable about the camera lens barrel whereby the gear is removable and is reusable. The inner diameter of the gear is elastically deformable by at least 0.6 millimeters In another embodiment, invention provides a gear for at least two camera lens barrels. The first camera lens barrel defines a first external lens diameter and the second camera lens barrel defines a second external lens diameter that is larger than the first external lens diameter. The gear includes a gear body having a continuous inner surface defining an inner diameter. The inner diameter is a first diameter less than the first external lens diameter when the gear body is not positioned about the first camera lens barrel. The inner diameter is a second diameter greater than the first diameter when the gear body is secured about the first camera lens barrel. The inner diameter is greater than the second diameter when the gear body is secured about the second camera lens barrel. The gear body further has a continuous outer surface that is toothed about the entire continuous outer surface.

Other aspects of the disclosure will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways.

DETAILED DESCRIPTION

Figure 1:
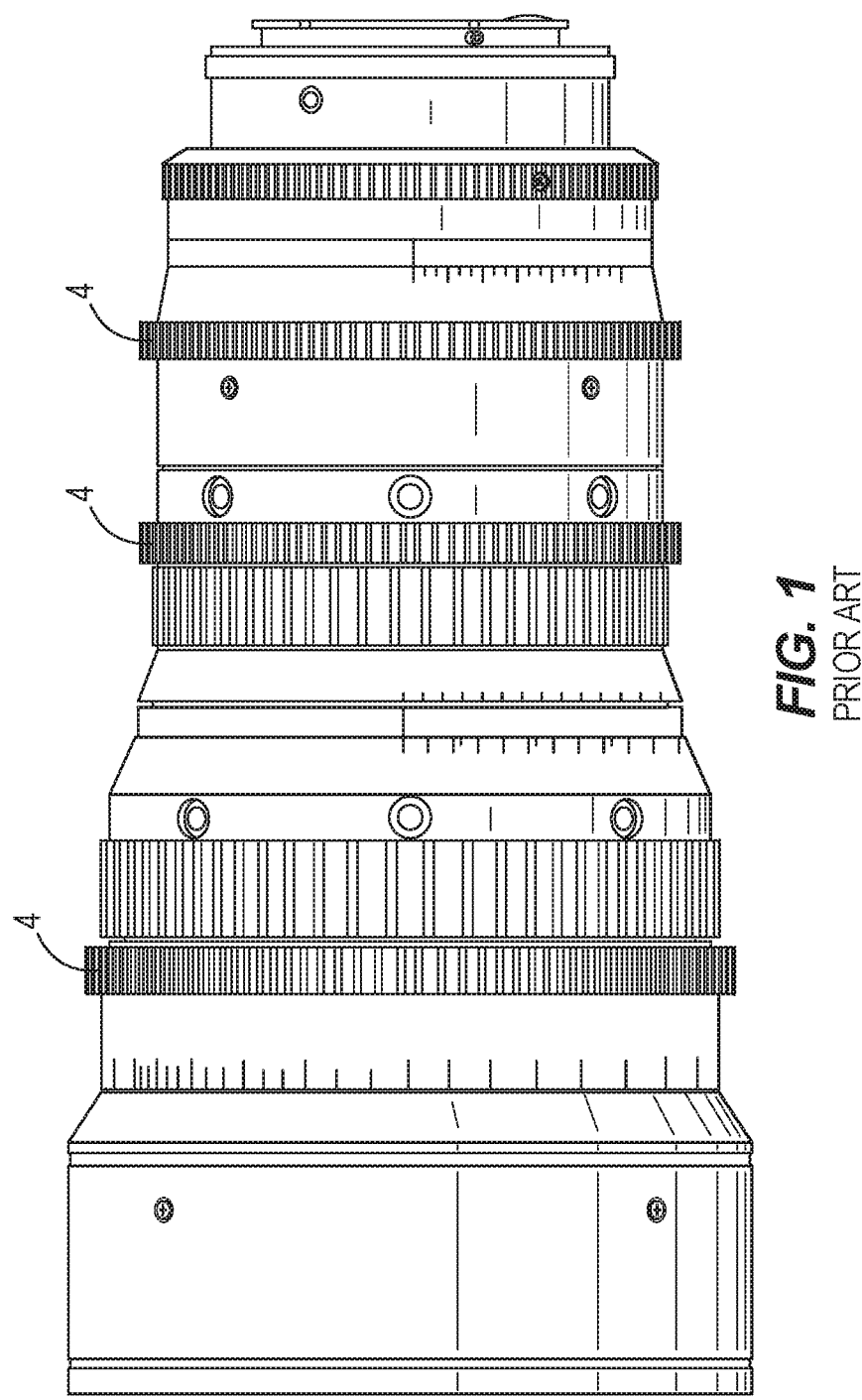
FIG. 1 is a side view of a prior art lens with integrated lens gears.
Figure 2:
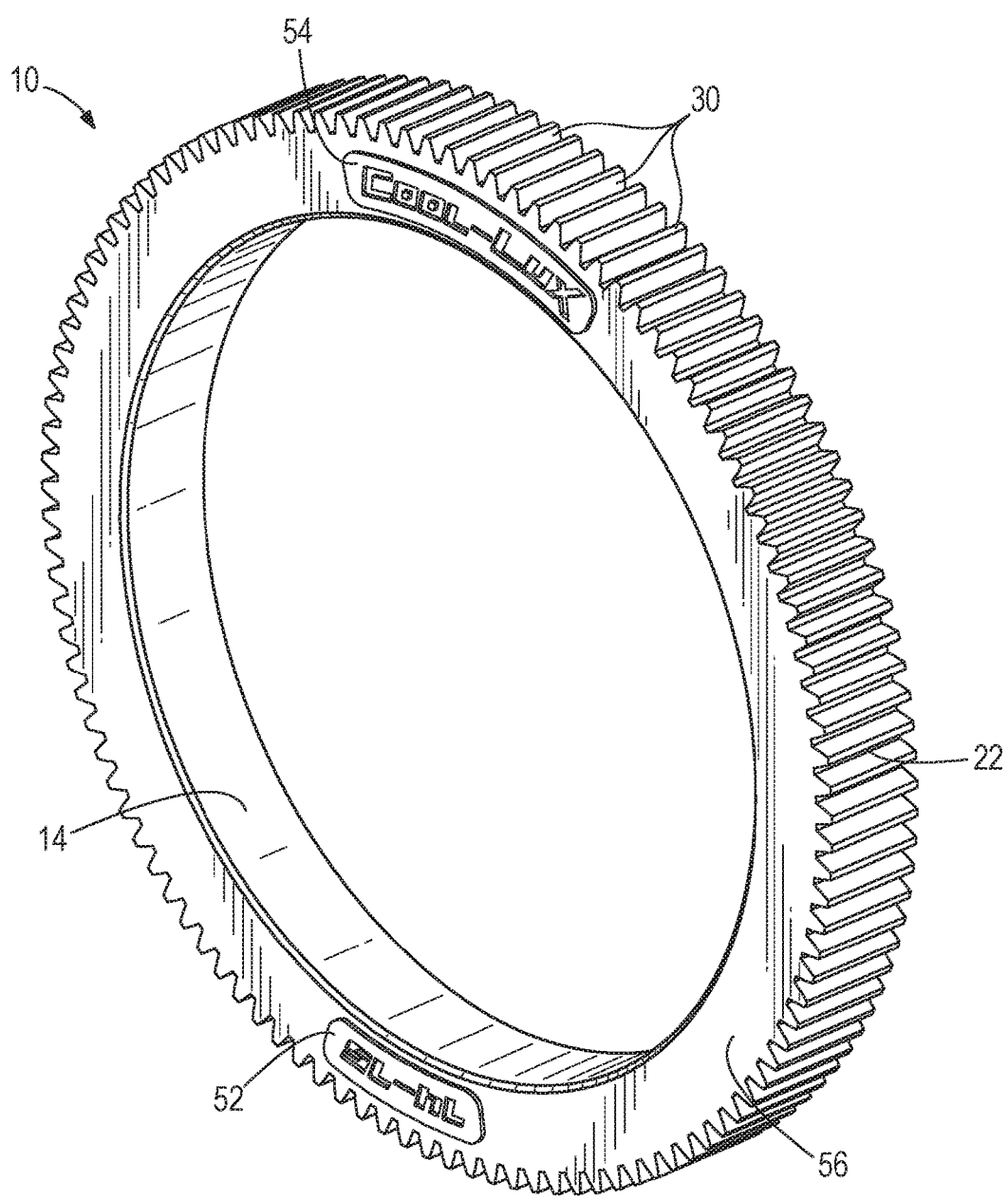
FIG. 2 is a perspective view of a supplemental gear.
Figure 4:
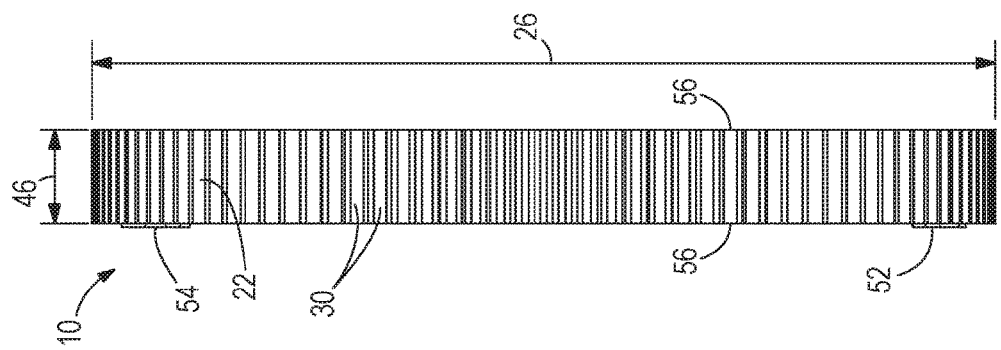
FIG. 4 is a side view of the gear of FIG. 2.
Figure 3:
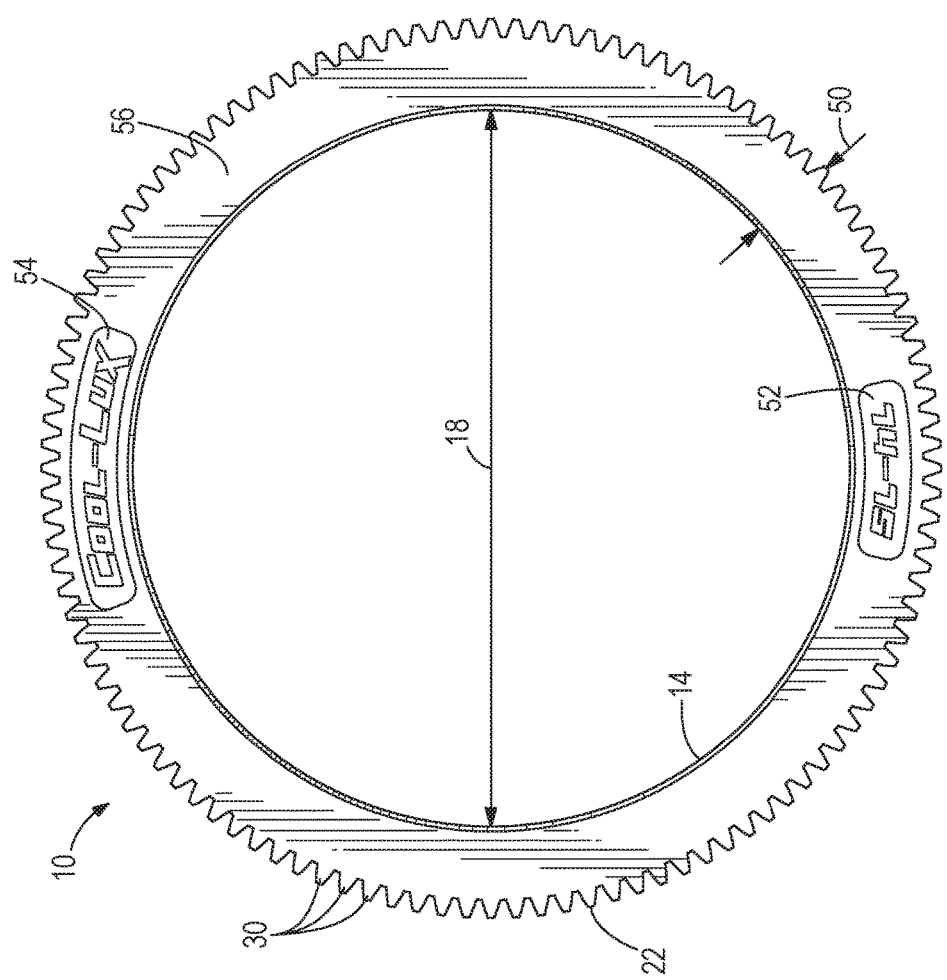
FIG. 3 is a front view of the gear of FIG. 2.

With reference to FIGS. 2-4, a gear 10 is a supplemental lens gear that can be stretched over and fitted on a camera lens barrel (e.g., a focus lens barrel, a zoom lens barrel, etc.). The gear 10 includes a gear body with a continuous inner surface 14 defining an inner diameter 18 (FIG. 3). The gear 10 further includes a continuous outer surface 22 defining an outer diameter 26 (FIG. 4). The outer surface 22 includes a plurality of gear teeth 30 thereon, which extend around the entire circumference of the outer surface 22. The gear teeth 30 have a cinema lens industry standard pitch known as "32 pitch" or "0.8 module." In addition, the gear teeth 30 have a pressure angle of 20 degrees. A width 46 (FIG. 4) of the gear 10 is approximately 3/8" (e.g., 9.5 mm). A thickness 50 (FIG. 3) of gear 10, defined as the difference between the outer diameter 26 and the inner diameter 18, is at least 1/8" thick. The thickness 50 should be great enough to prevent tooth deformation at higher stretch rates, as further explained below.

The gear 10 is preferably made from molded, high durometer silicone. In a preferred embodiment, the silicone has a type A hardness (e.g., Shore A Hardness) value of 80. In alternative embodiments, the gear material may have a type A hardness within a range from approximately 75 type A to approximately 85 type A. In further alternatives, the gear material may have a type A hardness within a range from approximately 60 type A to approximately 100 type A. The inner diameter 18 of the gear 10 is sufficiently deformable to allow the gear to be stretched and fitted onto a lens barrel by a user, but not so deformable as to distort the gear teeth 30 during use (e.g., when mounted around a lens barrel). A gear size 52, a company logo 54, or other indicia can be molded into a side 56 of the gear 10 as shown in FIG. 3. Either or both sides 56 of the gear 10 can be textured to present a leather-like or other appearance, which can give a higher perceived quality to the gear.

Figure 5:
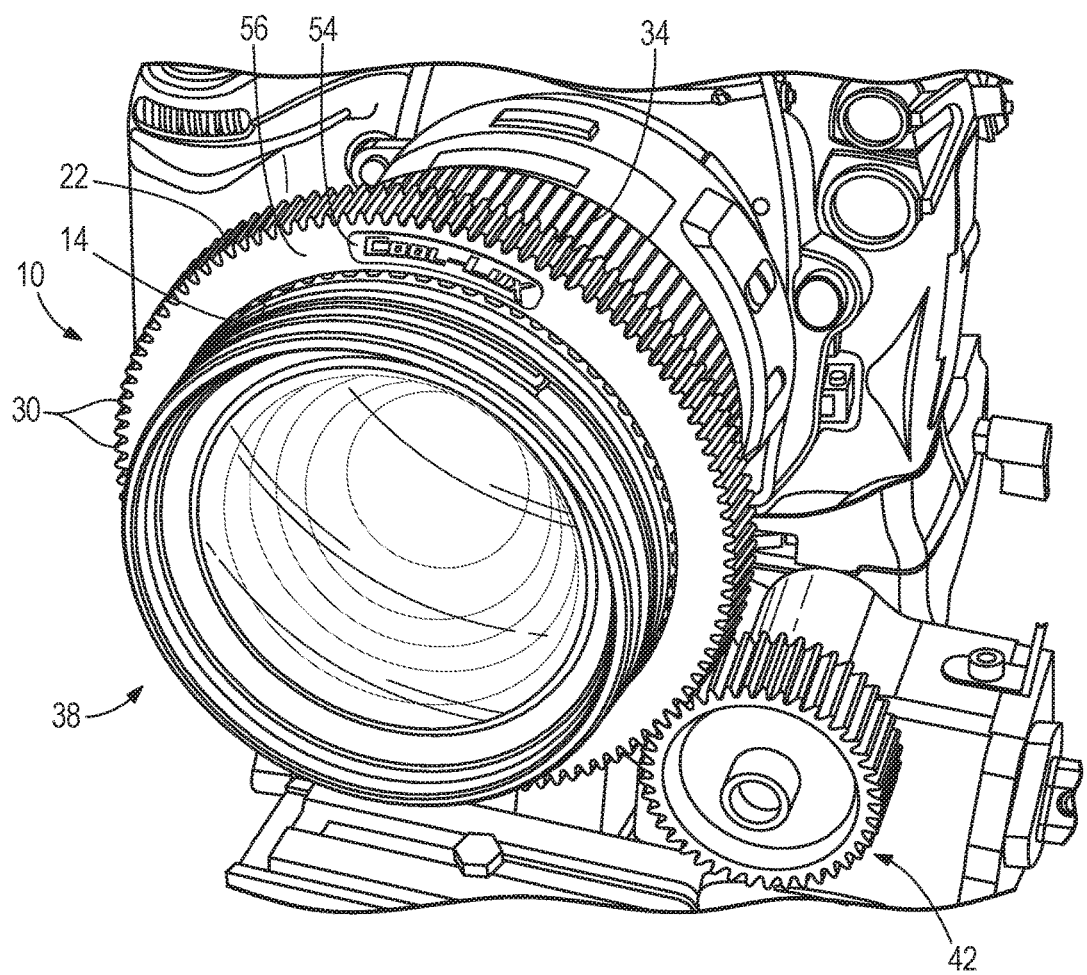
FIG. 5 is a perspective view of the gear of FIG. 2 positioned around a camera lens barrel.

Operation of the lens gear 10 will now be explained with reference to FIG. 5. To fit the gear 10 around a lens barrel 34 of a camera lens 38, a user elastically deforms the gear 10 to stretch the inner surface 14. With the gear 10 elastically deformed, the inner surface 14 is slid around the camera lens 38. Once the gear 10 is mounted around the camera lens 38, the user alternately pushes and pulls portions of the gear 10 into the desired position around the lens barrel 34. Once the gear 10 is straightened and in position, the gear 10 tightly grips the lens barrel 34, securely holding the gear 10 in place due to its elasticity. The continuous inner surface 14 of the gear 10 is coupled 360 degrees about the lens barrel 34 when the gear 10 is secured around the lens barrel 34. Once attached to the barrel 34, the gear 10 may be enmeshed with an actuator gear 42 of an external actuator (e.g., a geared electric motor, a manual dial adjustment, etc.). The actuator gear 42 rotates the gear 10, and since the gear 10 is in a press-fit engagement with the barrel 34, the barrel 34 co-rotates with the gear 10.

The supplemental lens gear 10 positioned around the lens barrel 34 provides the capability to rotate the barrel 34 a full, uninterrupted 360 degrees. No external fasteners, zip-ties, buckles, etc. on the gear 10 are used that could impede 360-degree driven rotation by the actuator gear 42. In other words, in contrast to supplemental gears with external fasteners or buckles, the continuous outer surface 22 of the lens gear 10 allows for 360 degrees of rotation when driven by the actuator gear 42. In addition, a user can quickly attach, remove, or reposition the gear 10 in a reusable fashion without the use of any tools. To remove the gear 10 from the camera lens 38, for example, a user alternately pushes and pulls portions of the gear 10 off the barrel 34, slightly deforming (i.e., stretching) the gear 10 as the gear 10 is incrementally worked off the barrel 34 in a manner similar to, but reverse from, the attachment of the gear 10. As such, the gear 10 is removable from a first lens barrel and reusable on a second lens barrel having a different outer diameter than the first lens barrel.

With reference to FIGS. 3 and 4, the gear 10 is flexible enough to cover a range of camera lens sizes. The gear 10, however, is not a one size fits all option. A consumer would instead purchase a gear that would best fit his particular lens. For example, a single gear of size "60-61" (gear size refers to the diameter of the lens barrel that it will accommodate) works with any camera lens having a barrel diameter between approximately 60 mm and approximately 61.9 mm. Additional gears may be provided with different inner diameters 18 of between approximately 60 mm and approximately 92 mm. In one embodiment, 16 inner diameter size groupings accommodate lens barrel diameters from 60 mm to 92 mm, with gear sizes stepping up every 2 mm. The family of gears with 16 inner diameter size groupings may have less than 16 (e.g., seven) corresponding outer diameter size groupings. Gear sizes are designed to correspond with known lenses (e.g., Nikon, Canon, Zeiss).

To ensure a tight grip around the barrel 34, the inner diameter 18 of the gear 10 is undersized by approximately 0.6 mm. For example, gear size 60-61 includes an inner diameter of 59.4 mm, and gear size 62-63 includes an inner diameter of 61.4 mm. In alternative embodiments, the inner diameter 18 of the gear 10 is undersized by at least 1.0 mm. In further alternative embodiments, the inner diameter 18 of the gear 10 is undersized by approximately 2.0 mm. In other words, the inner diameter 18 of the gear 10 is a first diameter less than the outer or external lens diameter when the gear body is not positioned about or secured about or in contact with (i.e., removed from, disengaged from, etc.) the camera lens barrel 34 and the inner diameter 18 is a second diameter greater than the first diameter when the gear body is secured or positioned about the camera lens barrel 34 via the elastic deformation of the gear 10. Further, the inner diameter 18 is greater than the second diameter when the gear 10 is secured about a second camera lens barrel (not pictured) that defines a second, larger external lens diameter. As such, the gear 10 is elastically deformable to increase the inner diameter by at least 0.6 mm and be removably secured to two different camera lens barrels having two different outer diameters. As a result, the same gear 10 can be removably secured to more than one lens barrel while still providing a press-fit engagement with both of the lens barrels.

The product can be marketed as individual gears or in kits containing a plurality of gears with each of the gears including a different inner diameter size. Packaging can include a clamshell package with a two-sided card insert.

Although specific embodiments of the invention are explained in detail, the invention is not limited to the details of construction and arrangement of components set forth in the described embodiments. The invention is capable of other embodiments and of being carried out in various ways.

I claim:

1. A gear for adjusting a camera lens barrel, the gear comprising:
  a gear body having a continuous inner surface defining an inner diameter and a continuous outer surface defining an outer diameter;
  wherein the gear is elastically deformable such that the gear is securable about the camera lens barrel whereby the gear is removable and is reusable;
  wherein the inner diameter is elastically deformable by at least 0.6 millimeters; and
  wherein the gear body is constructed from molded silicone having a type A hardness of between 60 type A and 100 type A.

2. The gear of claim 1, wherein the gear body is constructed from molded silicone having a type A hardness of between 75 type A and 85 type A.

3. The gear of claim 2, wherein the gear body is constructed from molded silicone having a type A hardness of 80 type A.

4. The gear of claim 1, wherein the continuous inner surface is coupled 360 degrees about the camera lens barrel when the gear is secured around the camera lens barrel.

5. The gear of claim 1, wherein the gear can be removed, secured, and repositioned around the camera lens barrel without the use of tools.

6. The gear of claim 1, wherein the continuous outer surface is toothed 360 degrees about the continuous outer surface.

7. The gear of claim 1, wherein the inner diameter is a first diameter less than an outer diameter of the camera lens barrel when the gear is not positioned about the camera lens barrel.

8. The gear of claim 7, wherein the inner diameter is greater than the first diameter when the gear is secured about the camera lens barrel.

9. The gear of claim 1, wherein the gear is coupled for co-rotation with the camera lens barrel by a press-fit engagement when the gear is secured about the camera lens barrel.

10. The gear of claim 1, wherein the inner diameter is elastically deformable by at least 1.0 millimeters.

11. A gear for at least two camera lens barrels, the first camera lens barrel defining a first external lens diameter and the second camera lens barrel defining a second external lens diameter that is larger than the first external lens diameter, the gear comprising:
  a gear body having a continuous inner surface defining an inner diameter, wherein the inner diameter is a first diameter less than the first external lens diameter when the gear body is not positioned about the first camera lens barrel;
  wherein the inner diameter is a second diameter greater than the first diameter when the gear body is secured about the first camera lens barrel;
  wherein the inner diameter is greater than the second diameter when the gear body is secured about the second camera lens barrel;

wherein the gear body further has a continuous outer surface that is toothed about the entire continuous outer surface; and wherein the gear body is constructed from a material having a type A hardness of between 60 type A and 100 type A.

12. The gear of claim 11, wherein the gear body is constructed from a material having a type A hardness of between 75 type A and 85 type A.

13. The gear of claim 12, wherein the gear body is constructed from a material having a type A hardness of 80 type A.

14. The gear of claim 11, wherein the gear is coupled for co-rotation with the first camera lens barrel and the second camera lens barrel by a press-fit engagement when the gear is secured about the first and second camera lens barrels.

15. The gear of claim 11, wherein the continuous inner surface is coupled 360 degrees about the first and second camera lens barrel when the gear is secured about the first and second camera lens barrel.

16. The gear of claim 11, wherein the gear can be removed, secured, and repositioned around the first and second camera lens barrel without the use of tools.

* * * * *